(12) United States Patent
Cummins et al.

(10) Patent No.: US 7,332,243 B2
(45) Date of Patent: Feb. 19, 2008

(54) BATTERY AND BATTERY CONTAINER

(75) Inventors: Gerald A. Cummins, Union, KY (US); Jack Bruss, Elm Grove, WI (US)

(73) Assignee: Johnson Controls Technology Company, Holland, MI (US)

( * ) Notice: Subject to any disclaimer, the term of this patent is extended or adjusted under 35 U.S.C. 154(b) by 733 days.

(21) Appl. No.: 10/754,475

(22) Filed: Jan. 9, 2004

(65) Prior Publication Data

US 2004/0170888 A1 Sep. 2, 2004

Related U.S. Application Data

(60) Provisional application No. 60/438,921, filed on Jan. 9, 2003.

(51) Int. Cl.
*H01M 2/00* (2006.01)
*H01M 2/24* (2006.01)
*H01M 2/08* (2006.01)
*H01M 2/04* (2006.01)

(52) U.S. Cl. ............... 429/163; 429/160; 429/175; 429/176

(58) Field of Classification Search ........... 429/149, 429/160, 163
See application file for complete search history.

(56) References Cited

U.S. PATENT DOCUMENTS

| | | | |
|---|---|---|---|
| 689,450 A | 12/1901 | Amwake | |
| 816,384 A | 3/1906 | Schneider | |
| 912,705 A | 2/1909 | Mason | |
| 1,193,358 A | 8/1916 | Carpenter | |
| 1,303,311 A | 5/1919 | Hazelett | |
| 1,306,679 A | 6/1919 | Ahlgren | |
| 1,532,263 A | 4/1925 | Reiser | |
| 1,699,446 A | 1/1929 | Porth | |
| 1,982,801 A | 12/1934 | Gerking | |
| 1,983,611 A | 12/1934 | Jackson | |
| 2,035,995 A | 3/1936 | Sturges | |
| 2,050,172 A | 8/1936 | Gordon | |
| 2,100,921 A | 11/1937 | Rolph | |
| 2,480,964 A | 9/1949 | Randall | |
| 3,510,376 A | 5/1970 | Freire et al. | |

(Continued)

FOREIGN PATENT DOCUMENTS

DE 371888 3/1923

(Continued)

OTHER PUBLICATIONS

U.S. Appl. No. 10/833,881 entitled "Battery Container", filed Apr. 28, 2004, inventors Daley et al. (26 pages).

*Primary Examiner*—Patrick Ryan
*Assistant Examiner*—Thomas H. Parsons
(74) *Attorney, Agent, or Firm*—Foley & Lardner LLP

(57) ABSTRACT

A housing for a vehicle battery includes a top portion configured for attachment to a battery cover and a plurality of containers extending from the top portion for containing elements of a battery. The plurality of containers are arranged in an offset configuration such that at least a portion of the top portion extends away from the plurality of containers due to the offset configuration. A structure for reinforcing the portion of the top portion is provided that extends away from the plurality of containers. According to one embodiment, the structure includes at least one rib for providing enhanced structural integrity for the portion of the top portion.

20 Claims, 5 Drawing Sheets

U.S. PATENT DOCUMENTS

| | | |
|---|---|---|
| 3,554,813 A | 1/1971 | Feldhake |
| 3,704,173 A | 11/1972 | McClelland et al. |
| 3,849,203 A | 11/1974 | Hollis et al. |
| 3,964,934 A | 6/1976 | Ching, Jr. et al. |
| 4,006,282 A | 2/1977 | Antoine |
| 4,075,368 A | 2/1978 | Salamon et al. |
| 4,227,140 A | 10/1980 | Nardella et al. |
| 4,233,373 A | 11/1980 | Meyler-Warlow et al. |
| 4,346,151 A | 8/1982 | Uba et al. |
| 4,383,011 A | 5/1983 | McClelland et al. |
| 4,385,100 A | 5/1983 | Hooke et al. |
| 4,407,911 A | 10/1983 | Hooke |
| 4,448,863 A | 5/1984 | Terrell |
| 4,510,215 A | 4/1985 | Adam |
| 4,522,899 A | 6/1985 | Illmann et al. |
| 4,522,900 A | 6/1985 | Mejia |
| 4,523,068 A | 6/1985 | Lund et al. |
| 4,554,221 A | 11/1985 | Schmid |
| D283,812 S | 5/1986 | Liautaud et al. |
| 4,592,927 A | 6/1986 | Stall |
| 4,592,972 A | 6/1986 | Juergens et al. |
| 4,684,580 A | 8/1987 | Cramer |
| 4,724,190 A | 2/1988 | Siga et al. |
| 4,780,379 A | 10/1988 | Puester |
| 4,859,547 A | 8/1989 | Adams et al. |
| D303,373 S | 9/1989 | Ching, Jr. |
| D304,926 S | 12/1989 | Ching, Jr. |
| D304,927 S | 12/1989 | Ching, Jr. et al. |
| D307,133 S | 4/1990 | Ching, Jr. |
| D307,886 S | 5/1990 | Ching, Jr. et al. |
| 5,091,273 A | 2/1992 | Hug et al. |
| 5,283,137 A | 2/1994 | Ching |
| 5,415,956 A | 5/1995 | Ching |
| 5,492,779 A * | 2/1996 | Ronning ............... 429/120 |
| 5,498,488 A | 3/1996 | Stocchiero |
| 5,578,392 A | 11/1996 | Kawamura |
| 5,599,641 A * | 2/1997 | Ching et al. ............ 429/179 |
| 5,856,037 A | 1/1999 | Casale et al. |
| 5,871,862 A | 2/1999 | Olson |
| 5,895,728 A | 4/1999 | Walker et al. |
| 5,922,490 A | 7/1999 | Kump |
| 5,998,062 A | 12/1999 | Olson |
| 6,004,689 A | 12/1999 | Walker et al. |
| 6,023,146 A | 2/2000 | Casale et al. |
| 6,025,086 A | 2/2000 | Ching |
| 6,051,336 A | 4/2000 | Dougherty et al. |
| 6,071,642 A | 6/2000 | Pospiech et al. |
| 6,174,618 B1 | 1/2001 | Nishiyama et al. |
| 6,190,795 B1 | 2/2001 | Daley |
| 6,221,524 B1 | 4/2001 | Andrew et al. |
| D442,542 S | 5/2001 | Dougherty et al. |
| 6,255,014 B1 | 7/2001 | Dougherty et al. |
| 6,265,091 B1 | 7/2001 | Pierson et al. |
| D450,035 S | 11/2001 | Ahlgren |
| 6,399,239 B2 | 6/2002 | Bolstad et al. |
| D466,478 S | 12/2002 | Bolstad et al. |
| 2005/0069762 A1* | 3/2005 | Daley et al. ............ 429/179 |

FOREIGN PATENT DOCUMENTS

| | | |
|---|---|---|
| EP | 0 140 581 | 2/1988 |
| GB | 1 379 293 | 1/1975 |

* cited by examiner

BATTERY AND BATTERY CONTAINER

CROSS-REFERENCE TO RELATED PATENT APPLICATIONS

This Application claims the benefit of priority as available under 35 U.S.C. § 119(e) of U.S. Provisional Patent Application No. 60/438,921, filed Jan. 9, 2003, which is incorporated herein by reference in its entirety.

FIELD

The present invention relates to batteries and containers for batteries. The present invention more specifically relates to batteries and battery containers having offset cell containers.

BACKGROUND

Batteries (e.g., lead-acid batteries for use in vehicle starting, lighting, and ignition, applications, commercial batteries, industrial batteries, marine batteries, etc.) include containers or housings that generally include a number of individual cell containers that are configured to provide containment for battery cell elements, which generally comprise one or more positive electrodes, one or more negative electrodes, a relatively porous polymeric separator between adjacent electrodes, and an electrolyte or acid (e.g., sulfuric acid). For example, a 12 Volt vehicle battery may include six individual cell containers.

During manufacturing of batteries, a battery cover is conventionally attached to a battery container by heat sealing or other means. During such operations, a downward pressure or force is applied to the cover and container to ensure that an adequate seal is provided between the cover and container.

Battery cell elements may be provided in a wound configuration (e.g., spiral wound) such that there is a single positive electrode and a single negative electrode separated by a relatively porous polymeric separator. The electrodes and the separator are wound such that the electrodes and separator have a generally cylindrical shape. Accordingly, the cell containers for containing such spiral wound cell elements is also provided in a relatively cylindrical configuration.

For certain applications, it may be desirable to provide a battery container that has individual cell containers (e.g., parallel rows of cell containers) arranged in an offset or staggered configuration. One example of such a configuration is shown in U.S. Pat. No. 5,599,641 titled "Battery Terminal and Case Structure" and which issued on Feb. 4, 1997. Such containers may include a top portion that overhangs or is provided over an area that is unsupported by cell containers due to the offset configuration of the cell containers. As shown in U.S. Pat. No. 5,599,641, such area may be utilized as a location for a battery terminal for connecting the battery to components of a vehicle electrical system.

It would be desirable to provide a battery container or housing that includes cell containers arranged in an offset or staggered configuration. It would also be desirable to provide a battery container that includes offset cell containers and that resists deformation during manufacturing and transport of the battery. It would also be desirable to provide a battery container that includes offset cell containers and that has at least a portion that is unsupported by cell containers and which resists has sufficient structural integrity to resist damage during manufacturing and transport of the battery. It would be desirable to provide a battery container and battery having one or more of these or other advantageous features.

SUMMARY

The present invention relates to a housing for a vehicle battery that includes a top portion configured for attachment to a battery cover and a plurality of containers extending from the top portion for containing elements of a battery. The plurality of containers are arranged in an offset configuration such that at least a portion of the top portion extends away from the plurality of containers due to the offset configuration. A structure for reinforcing the portion of the top portion is provided that extends away from the plurality of containers.

The present invention also relates to a housing for a vehicle battery that includes a base configured for coupling to a battery cover and a plurality of containers extending from the base and configured to contain battery electrodes, the plurality of containers. The housing also includes a first row of containers having at least two containers and a second row of containers having at least two containers and offset from the first row of containers. A first portion of the base extends away from the containers of the first row at an end of the first row of containers and a second portion of the base extends away from the containers of the second row of containers at an end of the second row of containers. The first portion includes a structure for buttressing the first portion and the second portion includes a structure for buttressing the second portion. The structures for buttressing the first portion and the second portion provide resistance to deformation of the first portion and the second portion when a force is applied to the first portion and the second portion.

The present invention also relates to a vehicle battery comprising a housing having a first row of generally aligned cell containers adjacent to a second row of generally aligned cell containers, with the first row of cell containers being offset from the second row of cell containers. A base is integrally formed with the two rows of cell containers and includes at least one portion which extends beyond the cell containers due to the offset configuration of the cell containers. A battery cover is coupled to the base. The vehicle battery also includes a structure for rigidifying the at least one portion which extends beyond the cell containers such that the structure provides enhanced resistance to damage to the at least one portion when a force is applied to the at least one portion.

The present invention also relates to a battery for a vehicle. The battery includes a housing comprising a top portion and a cover coupled to the top portion. The battery also includes a plurality of containers extending below the top portion and arranged in a plurality of rows, with each of the plurality of rows comprising a plurality of containers and being offset from an adjacent row. A portion of the top portion is not provided above one of the plurality of containers and includes at least one rib for providing enhanced strength for the portion of the top portion.

DETAILED DESCRIPTION OF THE PREFERRED AND EXEMPLARY EMBODIMENTS

Figure 1:
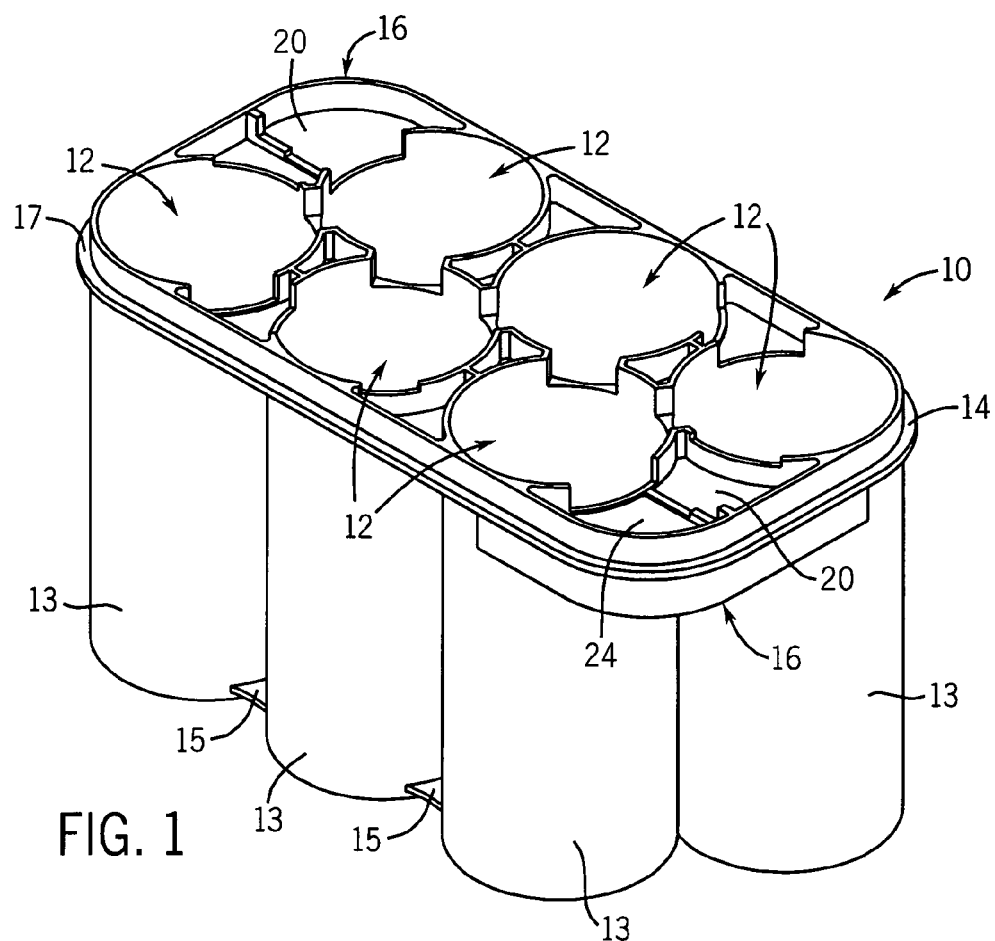
FIG. 1 is top perspective view of a battery container or housing according to an exemplary embodiment.
Figure 2:
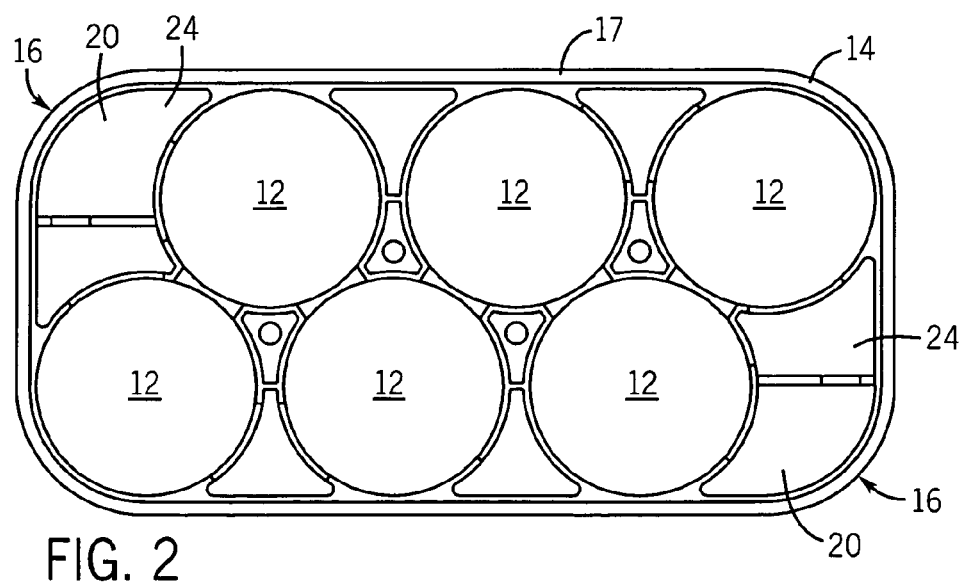
FIG. 2 is a top plan view of the battery container shown in FIG. 1.
Figure 3:
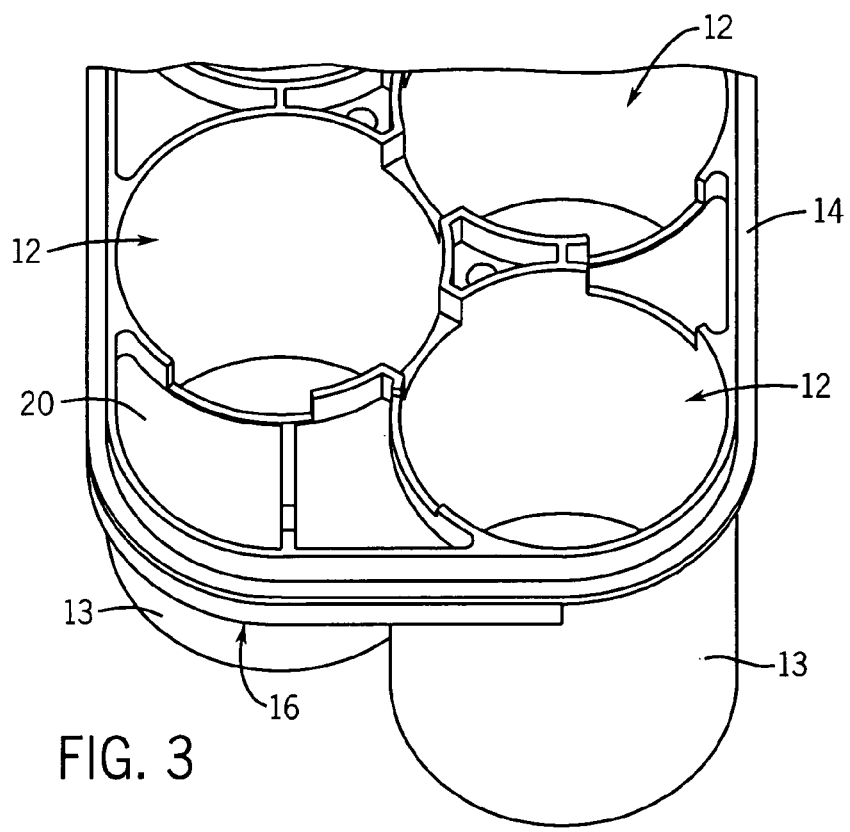
FIG. 3 is another top view of a portion of the battery container shown in FIG. 1.

FIG. 1 shows a perspective view of a container or housing 10 for a battery (e.g., such as a lead-acid battery for use in vehicle starting, lighting, and ignition applications, a commercial battery, an industrial battery, a marine battery, etc.) according to an exemplary embodiment. Container 10 includes a plurality of cell containers 12 arranged in an offset (e.g., staggered, shifted, or alternating) configuration (see, e.g., FIG. 2). Each of the cell containers 12 include one or more cell container walls 13 and is provided to contain, store, or house battery elements (e.g., positive and negative electrode(s), separator(s), and acid).

According to an exemplary embodiment, container 10 includes six cell containers 12. According to other exemplary embodiments, the container may include a different number of cell containers (e.g., more than or less than six cell containers, such as 12 cell containers). According to an exemplary embodiment, container 10 includes two rows of cell containers, with each of the rows including three cell containers. The rows are offset from each other as shown, for example, in FIG. 4. According to other exemplary embodiments, a different number of rows may be provided having three cell containers in each row or a different number of cell containers in each row (e.g., at least two cell containers). One advantageous feature of providing an offset configuration for the cell containers is that closer spacing of adjacent cell containers may be obtained as compared to a configuration in which the cell containers are not offset (e.g., as with a six-pack configuration).

According to an exemplary embodiment, reinforcing members or elements 15 are provided between adjacent cell containers 12 to provide added structural rigidity or integrity to battery container 10. According to an exemplary embodiment, reinforcing members 15 are integrally formed with container 10.

According to an exemplary embodiment, cell containers 12 are substantially or generally cylindrical in shape and are configured to contain wound or wrapped (e.g., spiral wound) cell elements that include one or more positive electrodes, one or more negative electrodes, and a porous polymeric separator provided intermediate or between adjacent positive and negative electrodes (not shown). According to an exemplary embodiment, such cell elements include a single positive electrode and a single negative electrode separated by an absorptive glass mat (AGM) type separator and wound in a generally spiral configuration.

According to various other exemplary embodiments, the cell containers may have any of a variety of shapes and/or sizes (e.g., a tapered cylinder, etc.) configured to accommodate any of a variety of cell elements.

Figure 7:
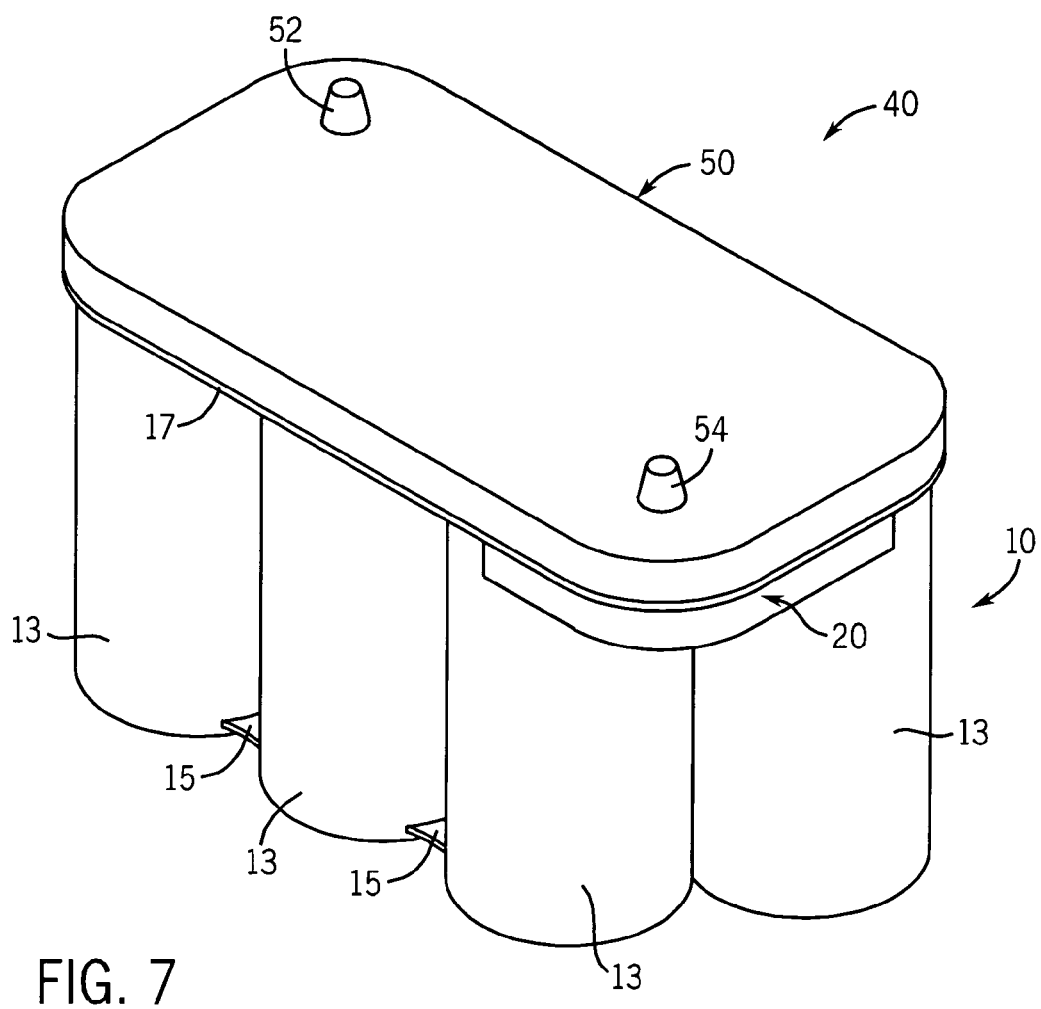
FIG. 7 is a perspective view of a battery utilizing a the battery cover shown in FIG. 1.

Container 10 includes a base or top portion 14 (e.g., a frame) that is configured for coupling (e.g., by heat sealing, adhesive, etc.) to a battery cover (see, e.g., FIG. 7). Base 14 forms the upper or top surface of container 10, and at least one portion 16 of base 14 overlies an area that is unsupported by cell container walls 13 (e.g., a portion of base 14 is provided over or above a portion of the battery container footprint where a cell wall is not provided due to the offset or staggered configuration of cell containers 12). In this manner, a portion of base 14 extends away from cell containers 12 due to the offset configuration. Base 14 has a shape (e.g., a generally rectangular shape having rounded corners, etc.) that has a length and a width and the footprint of the cell containers is smaller than the length of base 14 such that base 14 extends a greater distance than the rows of cell containers 12. The result is an overhang or ledge that extends beyond at least one of the rows of cell containers.

Cell containers 12 extend downward or away from base 14. Each of the cell containers are coupled or attached to (e.g., integrally formed with) base 14. Base 14 includes a rim or extension 17 that is configured to couple to a battery cover (e.g., by heat sealing, adhesive, etc.).

According to an exemplary embodiment, battery container 10 includes one or more structures, members, or elements 20 (e.g., shelves, ledges, rigidifying members or structures, etc.) extending outward from the battery container in the areas unsupported by cell container walls. According to an exemplary embodiment, structures 20 are integrally formed with container 10, such that structures 20 are coupled to one or more cell containers 12 (shown, e.g., as interface 22 in FIG. 5) and/or base 14 (e.g., such that structures 20 form a portion of base 14). According to another exemplary embodiment, the structures are not coupled to cell container walls (e.g., the structures are integrally formed with the base, etc.).

Structures 20 are advantageously provided with sufficient rigidity and reinforcement that structures 20 may be used as handles for the battery (e.g., one can lift a battery by grasping structures 20 and applying an upward force). Structures 20 are also configured to resist deformation during manufacturing processes (e.g., during head-sealing operations in which a cover is coupled to container 10).

According to an exemplary embodiment, container 10 includes two structures 20. According to other exemplary embodiments, a different number of such structures may be provided (e.g., one structure may be provided on each side of the battery, etc.).

At least a portion of base 14 is unsupported by a cell wall (e.g., the portion of structure 20 extending away from cell containers 12 is not supported on its underside by a cell wall such as cell container walls 13) due to the offset configuration of cell containers 12.

Structures 20 include a planar surface or portion 24 and a plurality of members or elements in the form of ribs or extensions 26 that extend from planar surface 24 to form a web or support structure 28. According to another exemplary embodiment, a planar surface is not provided, such that the structures consist of a plurality of ribs or extensions (e.g., arranged in a grid, "waffle," network, framework, or other pattern, etc.) coupled between a portion of the frame and the remainder of the housing (e.g., a cell container).

Figure 4:
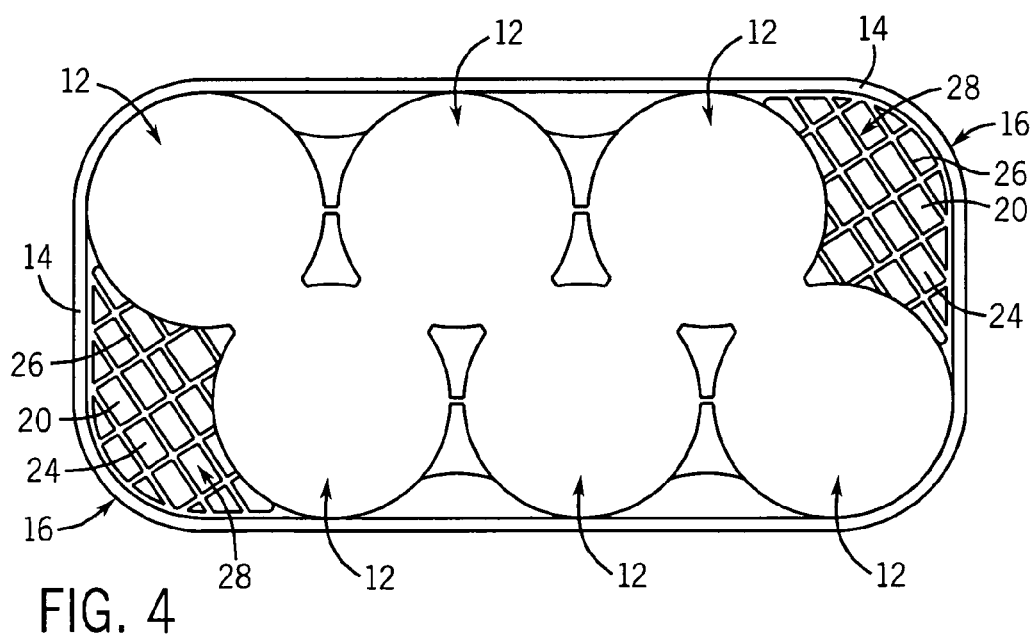
FIG. 4 is a bottom plan view of the battery container shown in FIG. 1.
Figure 5:
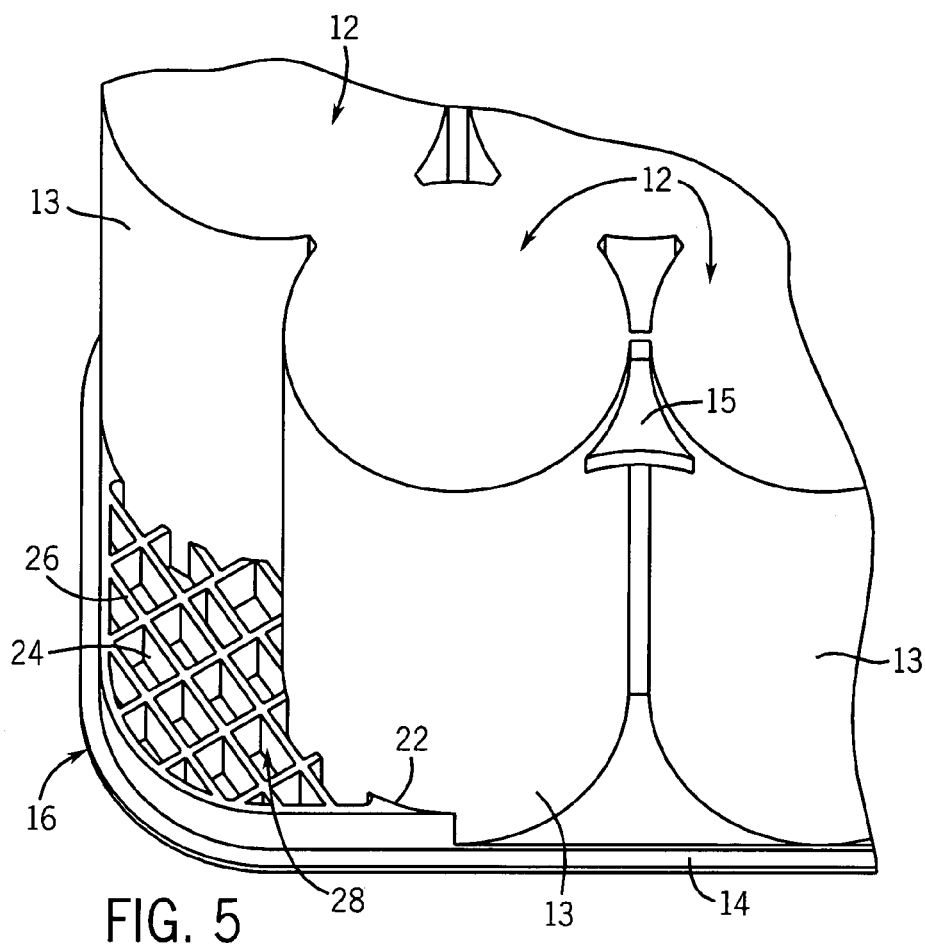
FIG. 5 is a perspective view of a portion of the battery container shown in FIG. 1.
Figure 6A:
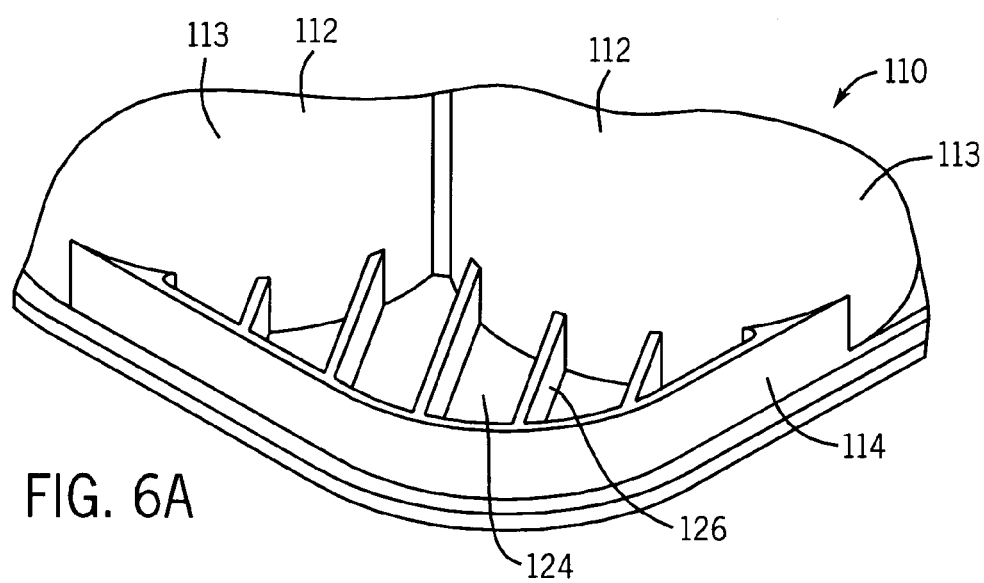
FIGS. 6A-6D are perspective views of portions of battery containers according to several other nonexclusive exemplary embodiments.
Figure 6B:
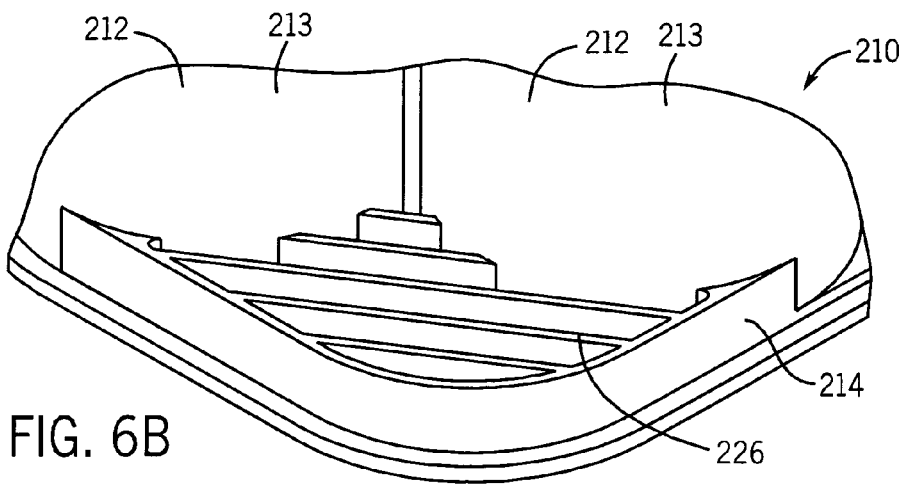
Figure 6C:
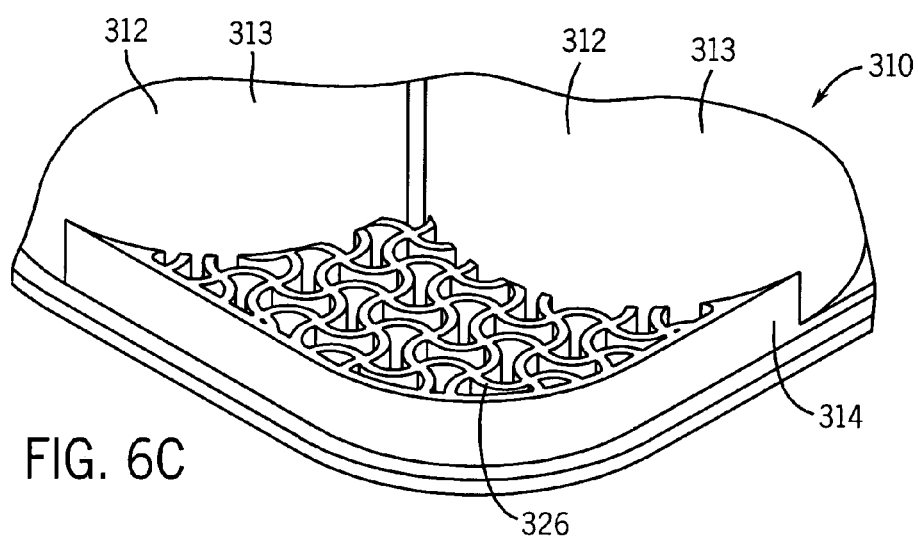
Figure 6D:
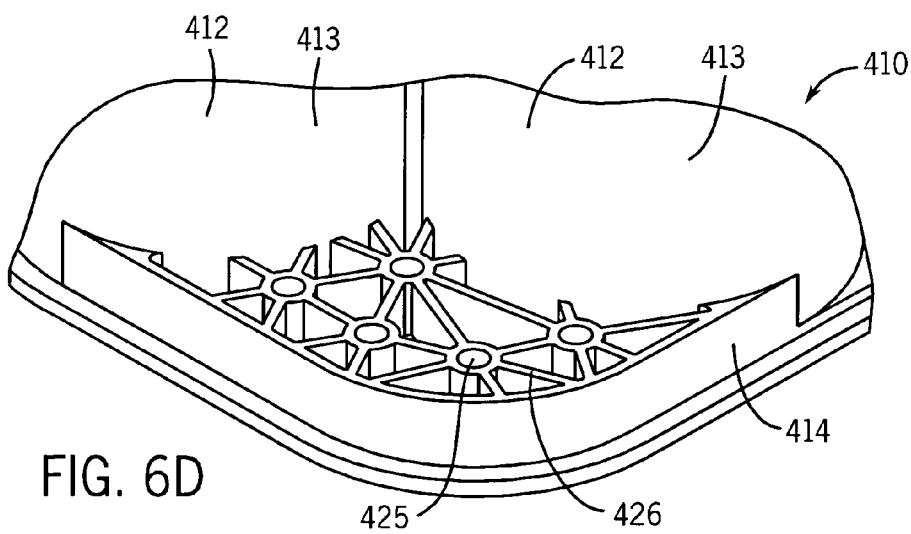

Ribs 26 may have a size, shape, or configuration that may vary based on any of a number of considerations (e.g., manufacturability, cost, material usage, structural support optimization, etc.). According to an exemplary embodiment, ribs 26 are arranged in a substantially rectangular grid pattern, such that the ribs are arranged substantially perpendicular or orthogonal to each other to form a "waffle-like" pattern. Such an embodiment is shown in FIGS. 4-5. According to alternative embodiments (nonexclusive examples of which are shown in FIGS. 6A-6D), the shape and configuration of the ribs or extensions may vary. For example, FIG. 6A shows a portion of a battery container 110 having a plurality of parallel ribs 126 extending from a planar surface 124 between a base 114 and a wall 113 of a cell container 112 according to an exemplary embodiment. FIG. 6B shows a portion of a battery container 210 having a plurality of parallel ribs 226 that extend either between two points on a base 214 or between two walls 113 of adjacent cell containers 212 according to an exemplary embodiment. FIG. 6C shows a portion of a battery container 310 having a plurality of generally non-linear (e.g., curved) ribs 326 that extend between various points on a base 314 and walls 313 of cell containers 312 according to an exemplary embodiment. FIG. 6D shows a portion of a battery container 400 having a plurality of ribs in the form of hubs 425 and spokes 426 that extend between various points on a base 414 and walls 413 of cell containers 412 according to an exemplary embodiment. Various other configurations for the ribs may also be utilized (e.g., a diamond pattern in which the ribs are not perpendicular or orthogonal to each other, etc.).

The width, thickness and/or the height of ribs 26 may also differ according to other exemplary embodiments (e.g., the height of the ribs (the distance the ribs extend from the planar surface) may be greater or less than that shown in the FIGURES). The configuration used for the ribs may also be configured to provide enhanced comfort for an individual using the handles to lift or move a battery (e.g., size and spacing of the ribs or extensions may provide a relatively comfortable gripping surface for an individual).

Ribs 26 may extend between battery container 10 (e.g., a cell wall) and a portion of structure 20 forming an outer edge or surface of structure 20. In this manner, movement of the structure relative to container 10 (e.g., twisting, bending, warping, etc.) may be reduced or eliminated.

According to an exemplary embodiment, the particular size, shape, and configuration of ribs 26 is optimized to provide enhanced structural rigidity of structures 20 during manufacturing or use. For example, the underside of structures 20 may be grasped by an individual such that the battery may be lifted or moved to a different location. To prevent deformation (e.g., bowing, warpage, twisting, sagging, etc.) of structures 20 or damage to the seal between battery container 10 and a battery cover (see, e.g., cover 50 in FIG. 7), the structural support provided by ribs 26 acts to maintain the structural integrity or rigidity of structures 20 despite the weight of the battery.

Ribs 26 may also reduce or eliminate deformation (e.g., warpage or other damage) of structures 20 during manufacturing operations. During manufacturing, a battery cover is heat-sealed or otherwise attached or coupled to base 14. The heat and/or pressure associated with coupling the battery cover to the base may act to deform (e.g., warp or bow, etc.) areas unsupported by cell container walls in the absence of enhanced structural support. To reduce or eliminate this occurrence, ribs 26 provided as part of structure 20 act to maintain the structural integrity of structure 20.

According to an exemplary embodiment, ribs 26 extend downward from planar surface 24 (e.g., toward the bottom of the battery container). According to other exemplary embodiments, the ribs or extensions may extend upward from a planar surface or may be sandwiched between two planar surfaces (e.g., an upper and a lower planar surface).

Ribs 26 extend substantially perpendicular to planar surface 24. According to another exemplary embodiment, the ribs or extensions do not extend substantially perpendicular to the planar surface (e.g., the ribs or extensions extend at an acute angle to the planar surface).

Battery container 10 may be made of any of a variety of polymeric materials configured or adapted to resist degradation from acid (e.g., sulfuric acid) provided within the battery elements. For example, battery container 10 may be made of a polypropylene-containing material (e.g., pure polypropylene, copolymers comprising polypropylene, polypropylene with additives, etc.) or composite (e.g., glass-reinforced polymer) material.

According to an exemplary embodiment, the entire battery container (including the handles) is made of the same material. According to an alternative embodiment, at least a portion of the one or more structures (e.g., structures 20) are made of a different material than the remainder of the battery container. The material used to form such structures may be optimized to maintain structural integrity of the structure and adjacent base.

According to an exemplary embodiment, structures 20 including ribs 26 are integrally formed with battery container 10 (e.g., the entire container, including the structures, are injection molded as a single piece). According to other exemplary embodiments, the structures may be produced separately and coupled to the container.

The design or configuration of ribs 26 (e.g., the pattern of layout used for ribs 26, etc.) may be chosen based on any of a variety of factors (e.g., manufacturability, cost, material usage, structural support optimization, etc.). According to an exemplary embodiment, ribs 26 are arranged in the form of a substantially rectangular grid, such that the ribs or extensions are arranged substantially perpendicular to each other. According to other exemplary embodiments, any of a variety of other configurations may be used, nonexclusive examples of which are shown in FIGS. 6A-6D.

FIG. 7 is a perspective view of a battery 40 utilizing the battery container shown in the exemplary embodiment illustrated in FIG. 1. A battery cover 50 is coupled to battery container 10 (e.g., heat-sealed to rim 17). A positive terminal 52 and a negative terminal 54 are provided for electrically coupling the battery to an electrical system of a vehicle (e.g., by battery cables coupled to the terminals.

It is important to note that the construction and arrangement of the elements of the battery container as shown in the preferred and other exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited herein. For example, elements shown as integrally formed may be constructed of multiple parts or elements (e.g., instead of providing the handles as integrally formed with the battery container, the handles may be produced separately and coupled to the battery container), the position of elements may be reversed or otherwise varied (e.g., the ribs or extensions may extend upward from a planar surface rather than downward toward the base of the battery), and the nature or number of discrete elements or positions may be altered or varied (e.g., the number of ribs or extensions provided in the battery handle may differ, the cell containers may be arranged in a non-offset configuration (e.g., such as a six-pack of soda cans is arranged) and a handle having ribs may be provided in the space between adjacent cell containers., etc.). It should be noted that the elements and/or assemblies of the system may be constructed from any of a wide variety of materials that provide sufficient strength or durability, including any of a wide variety of moldable plastic materials (such as high-impact plastic) in any of a wide variety of colors, textures and combinations. Other substitutions, modifications, changes and omissions may be made in the design, operating conditions and arrangement of the preferred and other exemplary embodiments without departing from the scope of the present inventions.

What is claimed is:

1. A housing for a vehicle battery comprising:
a top portion configured for attachment to a battery cover;
a plurality of containers extending from the top portion for containing elements of a battery, the plurality of containers being arranged in an offset configuration such that at least a portion of the top portion extends away from the plurality of containers due to the offset configuration; and
a structure for reinforcing the portion of the top portion that extends away from the plurality of containers wherein the structure is not provided above one of the plurality of containers.

2. The housing of claim 1 wherein the structure includes a relatively planar surface and a plurality of ribs extending from the relatively planar surface.

3. The housing of claim 2 wherein the plurality of ribs are arranged in a rectangular grid pattern.

4. The housing of claim 2 wherein the plurality of ribs are arranged as a framework for providing enhanced structural integrity for the portion of the top portion.

5. The housing of claim 1 wherein the structure is configured to resist deformation of the portion of the top portion when a force is applied to the portion of the top portion.

6. The housing of claim 5 wherein the structure is integrally formed with the top portion.

7. The housing of claim 1 wherein each of the plurality of containers has a generally cylindrical shape.

8. The housing of claim 1 wherein the housing comprises six containers extending from the top portion for containing elements of a battery.

9. The housing of claim 1 wherein the top portion includes a rim for attaching the housing to a battery cover.

10. The housing of claim 1 wherein the plurality of containers are arranged in a plurality of rows offset from each other, each of the plurality of rows having at least two containers.

11. A housing for a vehicle battery comprising:
a base configured for coupling to a battery cover;
a plurality of cylindrical containers extending from the base, the plurality of containers being arranged in an offset position such that a portion of the base extends away from the containers; and
a structure for reinforcing the portion of the base that extends away from the plurality of cylindrical containers wherein the structure is not provided above one of the plurality of cylindrical containers.

12. The housing of claim 11 wherein the structure includes a plurality of ribs.

13. The housing of claim 12 wherein the plurality of ribs are arranged in a generally rectangular grid.

14. The housing of claim 12 wherein the plurality of ribs are arranged in a non-linear fashion.

15. The housing of claim 11 wherein the structure is integrally formed with the housing.

16. A housing for a vehicle battery comprising:
a top portion configured for attachment to a battery cover;
a plurality of containers extending from the top portion for containing elements of a battery, the plurality of containers being arranged in an offset configuration such that at least a portion of the top portion extends away from the plurality of containers due to the offset configuration; and
a structure for reinforcing the portion of the top portion that extends away from the plurality of containers, the structure including a plurality of ribs;
wherein each of the plurality of containers includes at least one wall and at least one of the plurality of ribs extends from a first wall of one of the plurality of containers to at least one of a frame of the structure and a second wall of one of the plurality of containers.

17. The housing of claim 16 wherein each of the plurality of cylinders has a generally cylindrical shape.

18. The housing of claim 16 wherein the plurality of ribs are arranged in a rectangular grid.

19. The housing of claim 18 wherein the structure is integrally formed with the top portion.

20. The housing of claim 16 wherein the structure is configured to resist deformation of the top portion when a force is applied to the portion of the top portion.

* * * * *